United States Patent [19]

Deyrup

[11] Patent Number: 4,753,980
[45] Date of Patent: Jun. 28, 1988

[54] TOUGHENED THERMOPLASTIC POLYESTER COMPOSITIONS

[75] Inventor: Edward J. Deyrup, Northeast, Md.

[73] Assignee: E. I. Du Pont de Nemours & Company, Wilmington, Del.

[21] Appl. No.: 930,997

[22] Filed: Nov. 14, 1986

Related U.S. Application Data

[63] Continuation of Ser. No. 704,533, Feb. 22, 1985, abandoned, which is a continuation-in-part of Ser. No. 582,988, Feb. 24, 1984, abandoned.

[51] Int. Cl.$^4$ .............................................. C08L 67/02
[52] U.S. Cl. .................................... 524/369; 524/378; 524/394; 524/424; 524/427; 524/444; 524/449; 524/452; 524/513; 525/166; 525/173; 525/174; 525/176
[58] Field of Search ............... 525/166, 173, 176, 174; 524/378, 375, 372, 513, 369, 394, 427, 424, 444, 449, 452

[56] References Cited

U.S. PATENT DOCUMENTS

| | | | |
|---|---|---|---|
| 3,591,659 | 7/1971 | Brinkmann et al. | 260/873 |
| 3,793,262 | 2/1974 | Logothetis | 260/86.7 |
| 3,925,326 | 12/1975 | Logothetis | 260/78.5 |
| 4,022,748 | 5/1977 | Schlichting et al. | 260/40 |
| 4,034,013 | 7/1977 | Lane | 260/835 |
| 4,172,859 | 10/1979 | Epstein | 428/402 |
| 4,275,180 | 6/1981 | Clarke | 525/173 |
| 4,284,540 | 8/1981 | Iida et al. | 260/22 |
| 4,317,764 | 3/1982 | Sheer | 524/449 |
| 4,322,335 | 3/1982 | Nield | s523/522 |

FOREIGN PATENT DOCUMENTS

| | | |
|---|---|---|
| 0055473 | 7/1982 | European Pat. Off. |
| 57-123251 | 7/1982 | Japan |
| 1241168 | 7/1971 | United Kingdom |
| 2015014 | 9/1979 | United Kingdom |

*Primary Examiner*—Patricia Short

[57] ABSTRACT

Toughened thermoplastic polyester compositions comprising 60–97 weight % of a polyester matrix resin and 3–40 weight % of an ethylene copolymer such as ethylene/methylacrylate/glycidyl methacrylate.

28 Claims, No Drawings

TOUGHENED THERMOPLASTIC POLYESTER COMPOSITIONS

CROSS-REFERENCE TO RELATED APPLICATION

This application is a continuation of application Ser. No. 704,533 filed Feb. 22, 1985, now abandoned, which is a continuation-in-part of U.S. Application Ser. No. 582,988, filed Feb. 24, 1984, now abandoned.

DESCRIPTION

1. Technical Field

This invention relates to certain polyester molding compositions characterized by extraordinary toughness. The most common polyester molding compositions are based on polyethylene terephthalate homopolymers, polybutylene terephthalate homopolymers, polyethylene terephthalate/polybutylene terephthalate copolymers, polyethylene terephthalate/polybutylene terephthalate mixtures, and mixtures thereof, although other polyesters can be used as well, alone, in combination with each other, or in combination with those polyesters listed above. Such other polyesters include copolyetheresters, such as described in U.S. Pat. Nos. 3,651,014; 3,763,109; and 3,766,146. In any event, compositions based on such polyesters are useful in preparing semi-finished and finished articles by any of the techniques commonly used with thermoplastic materials, e.g., compression molding, injection molding, extrusion, blow molding, rotational molding, melt spinning, stamping and thermoforming. Finished products made from such compositions possess extremely desirable physical properties, including strength and flexural modulus. However, in certain applications, it would be desirable to have greater toughness, particularly at low temperatures, than has heretofore been possible with conventional polyester molding compositions.

2. Background Art

U.S. Pat. No. 4,172,859, granted Oct. 30, 1979 to B. N. Epstein, discloses multiphase thermoplastic molding compositions where one phase contains 60–99 weight percent of the matrix resin and is a polyester matrix resin, and the remaining phase or phases contain 1–40 weight percent of the matrix resin and is a random copolymer having particle size in the range of 0.01–3.0 microns, which copolymer is adhered to the matrix resin, has a tensile modulus of 1.0–20,000 psi, and has a tensile modulus of less than 1/10th the tensile modulus of the matrix resin. Among the random copolymers disclosed and exemplified by Epstein in such compositions are poly(ethylene/methylacrylate/glycidyl/methacrylate) and poly(ethylene/vinyl acetate/glycidyl methacrylate). Such compositions are characterized as toughened as compared with unmodified polyester compositions.

U.S. Pat. No. 4,284,540, granted Aug. 18, 1981 to Iida et al., discloses impact-modified polyethylene terephthalate molding compositions which include a copolymer of α-olefins and glycidyl esters of α,β-ethylenically unsaturated carboxylic acids and barium salts of fatty acids.

Neither of these references disclose the particular compositions of the present invention or the unexpected superior low temperature toughness that characterizes the particular compositions of the present invention.

3. Disclosure of the Invention

This invention relates to certain polyester molding compositions characterized by extraordinary toughness, especially at low temperatures. More specifically, it has been found that when certain ethylene copolymer tougheners are blended into a polyester matrix such that the ethylene copolymer is dispersed throughout the polyester matrix as a discrete phase or discrete particles, which particles have a number average particle size of less than 3 micrometers, then such compositions possess extraordinary low temperature toughness, as measured by a standard notched Izod test (ASTM D-256) with the samples at temperatures of 0° C. or lower. This is particularly unexpected, because polyester molding compositions made with certain ethylene copolymers known as tougheners for polyester molding compositions are markedly inferior with respect to low temperature toughness, even as compared to the polyester molding compositions of the present invention containing an ethylene copolymer toughener which is an adjacent homolog to the known ethylene copolymer toughener.

The term "polyester" as used herein includes polymers having an inherent viscosity of 0.3 or greater and which are, in general, linear saturated condensation products of glycols and dicarboxylic acids, or reactive derivatives thereof. Preferably, they will comprise condensation products of aromatic dicarboxylic acids having 8 to 14 carbon atoms and at least one glycol selected from the group consisting of neopentyl glycol, cyclohexane dimethanol and aliphatic glycols of the formula $HO(CH_2)_nOH$ where n is an integer of 2 to 10. Up to 50 mole percent of the aromatic dicarboxylic acids can be replaced by at least one different aromatic dicarboxylic acid having from 8 to 14 carbon atoms, and/or up to 20 mole percent can be replaced by an aliphatic dicarboxylic acid having from 2 to 12 carbon atoms.

Preferred polyesters include polyethylene terephthalate; poly(1,4-butylene)terephthalate; and 1,4-cyclohexylene dimethylene terephthalate/isophthalate copolymer and other linear homopolymer esters derived from aromatic dicarboxylic acids, including isophthalic, bibenzoic, naphthalene-dicarboxylic including the 1,5-; 2,6-; and 2,7-naphthalenedicarboxylic acids; 4,4'-diphenylenedicarboxylic acid; bis(p-carboxyphenyl)methane; ethylene-bis-p-benzoic acid; 1,4-tetramethylene bis(p-oxybenzoic) acid; ethylene bis(p-oxybenzoic) acid; 1,3-trimethylene bis(p-oxybenzoic) acid; and 1,4-tetramethylene bis(p-oxybenzoic) acid, and glycols selected from the group consisting of 2,2-dimethyl-1,3-propane diol; neopentyl glycol; cyclohexane dimethanol and aliphatic glycols of the general formula $HO(CH_2)_nOH$ where n is an integer from 2 to 10, e.g., ethylene glycol; 1,3-trimethylene glycol; 1,4-tetramethylene glycol; 1,6-hexamethylene glycol; 1,8-octamethylene glycol; 1,10-decamethylene glycol; 1,3-propylene glycol; and 1,4-butylene glycol. Up to 20 mole percent, as indicated above, of one or more aliphatic acids, including adipic, sebacic, azelaic, dodecanedioic acid or 1,4-cyclohexanedicarboxylic acid can be present.

The most common polyester molding compositions are based on polyethylene terephthalate homopolymers, polybutylene terephthalate homopolymers, polyethylene terephthalate/polybutylene terephthalate copolymers, polyethylene terephthalate/polybutylene terephthalate mixtures and mixtures thereof, although other polyesters can be used as well, alone, in combination with each other, or in combination with those polyesters listed above. Such other polyesters include copolyetheresters such as described in U.S. Pat. Nos. 3,651,014; 3,763,109 and 3,766,146.

The inherent viscosity of the polyesters is measured at a concentration of 0.32 grams/100 ml. in trifluoroacetic acid (25)/methylene chloride (75) at 25±0.10° C. It is computed by the formula $$\text{Inherent viscosity} = \frac{\text{natural log} \frac{\text{elution time of solution}}{\text{elution of solvent}}}{C}$$

where C is the concentration expressed in grams of polymer per 100 ml of solution.

The polyester will comprise the matrix resin and further will comprise 60–97 weight % of the compositions of the present invention based on the total weight of the polyester and the ethylene copolymer toughener to be described below. The polyester will preferably comprise 65–95% by weight, and most preferably, 70–85% by weight of the composition.

The compositions of the present invention will also contain 3–40 weight %, preferably 5–35 weight %, and most preferably, 15–30 weight % of an ethylene copolymer toughener, each of the above percentages being based on the total of the polyester and the ethylene copolymer only. The ethylene copolymer is a copolymer of the formula E/X/Y where
E is the radical formed from ethylene and comprises 40–90 weight percent of the ethylene copolymer,
X is the radical formed from

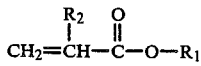

where $R_1$ is an alkyl group with 2–8 carbon atoms, preferably 4–6 carbon atoms, and most preferably 4 carbon atoms, and
$R_2$ is H, $CH_3$ or $C_2H_5$, preferably H or $CH_3$, and most preferably H, and X comprises 10–40 weight percent, preferably 15–35 wt %, most preferably 20–35 wt % of the ethylene copolymer, and
Y is selected from the group consisting of glycidyl methacrylate and glycidyl acrylate and Y comprises 0.5–20 weight percent, preferably 2.0–10 wt %, most preferably 3–8 wt % of the ethylene copolymer.

Additional comonomers, e.g. CO and methyl acrylate, can also be present in minor amount, provided that the essential characteristics of the ethylene copolymer are not substantially altered.

The ethylene copolymers used in the compositions of the present invention can be prepared by direct copolymerization, for example, copolymerization of ethylene, glycidyl methacrylate or glycidyl acrylate, and the above-defined acrylate or methacrylate, X, in the presence of a free-radical polymerization initiator at elevated temperatures, preferably 100°–270° C., and most preferably 130°–230° C., and at elevated pressures, preferably at least 70 MPa, and most preferably 140–350 MPa.

In addition to the polyester matrix resin and the ethylene copolymer toughener, the compositions of the present invention can contain a variety of additional ingredients, including 0–15 parts by weight of a plasticizer per hundred parts of the matrix resin, 0–15 parts by weight of polyalkylene oxide "soft segments" incorporated into the matrix resin polymer chain per hundred parts of the matrix resin (such as disclosed in copending U.S. Application Ser. No. 582,991, filed Feb. 24, 1984 by W. E. Garrison, Jr.), 0–16 parts by weight of a crystallization promoter per hundred parts by weight of the matrix resin, and up to 80% by weight of reinforcing or filling material. Additional ingredients which can be incorporated into the compositions of the present invention include epoxy compounds, lubricants, pigments, flame retardants, antioxidants, mold-release agents, ultraviolet light and heat stabilizers, nucleating agents and polymers used for convenience of processing to prepare concentrates.

Plasticizers can be any known in the art (see, e.g. U.K. Pat. Nos. 2,015,013 and 2,015,014) to be useful in polyester molding compositions. However, particularly useful plasticizers for polyethylene terephthalate and polyethylene terephthalate/polybutylene terephthalate molding compositions are compounds of the formula

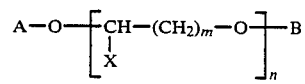

where
m is an integer from 1 to 3, inclusive,
n is an integer from 4 to 25, inclusive,
X is $CH_3$, $C_2H_5$ or H,
A is alkyl, acyl or aroyl of 1 to 10 carbon atoms, and
B is alkyl, acyl or aroyl of 1 to 10 carbon atoms,
Preferred plasticizers for use in the compositions of the present invention are those described above where
m is one, or where
n is 4 to 14, or where
X is H,
and especially where m is one, n is 4 to 14, and X is H. More preferred plasticizers for use in the compositions of the present invention are those described above where
m is one, or where
n is 7 to 13, or where
X is H, or where
A is acyl of 8 carbon atoms or methyl, or where
B is acyl of 8 carbon atoms,
and especially where m is one, n is 7 to 13, X is H, A is acyl of 8 carbon atoms or methyl, and B is acyl of 8 carbon atoms. Polyethylene glycol 400 bis(2-ethylhexanoate), methoxy polyethylene glycol 550 2-ethylhexanoate and tetraethylene glycol bis(2-ethylhexanoate) are especially preferred. Polyethylene glycol 400 bis(2-ethylhexanoate) is most preferred.

The polyalkylene oxide "soft segment" is especially preferred for use with compositions of the present invention based on polyethylene terephthalate and on polyethylene terephthalate/polybutylene terephthalate copolymers and/or mixtures. The polyalkylene oxide is preferably predominantly or all polyethylene oxide and preferably is introduced into the polymer chain as a copolymer of polyethylene glycol terephthalate (optionally containing a minor proportion of other alkylene units) and polyethylene terephthalate or is introduced into the polymer chain by reaction in the melt of polyethylene glycol (optionally containing a minor proportion of other alkylene units) with polyethylene terephthalate. When the matrix resin is a mixture and/or copolymer of polyethylene terephthalate and polybutylene terephthalate, the polyalkylene oxide can be incorporated into the polymer chain by direct copolymerization of polyethylene terephthalate, polybutylene terephthalate and polyalkylene glycol, by let-down of polybutylene terephthalate/polyalkylene oxide copolymer with polyethylene terephthalate, or by direct addition of polyalkylene oxide to polyethylene terephthalate/polybutylene terephthalate copolymer. The molecular weight of the polyalkylene oxide should be in the range of 200 to 3250, preferably 600 to 1500. The total weight proportion of the soft segment plus the plasticizer in the compositions of the present invention should be from 9-20 parts by weight per hundred parts of the matrix resin, preferably 9-18% parts by weight and most preferably, 12-18% parts by weight. The relative quantities of soft segment and plasticizer in the compositions of the present invention can vary from 85:15 to 15:85, but preferably will be between 75:25 and 40:60, most preferably between 65:35 and 40:60.

The crystallization promoter can be one which is derived from (a) hydrocarbon acids containing between about 7 and 54 carbon atoms or organic polymers having at least one carboxyl group attached thereto, and (b) sodium and/or potassium ion sources capable of reacting with the carboxyl groups of the acids or polymers of (a).

The crystallization promotor should be such that it contains the sodium and/or potassium ion source in sufficient quantity such that the sodium and/or potassium concentration in the matrix resin is greater than 0.01 weight percent. Preferably, the crystallization promotor is an organic ionic hydrocarbon copolymer of an -olefin of 2-5 carbon atoms and an $\alpha,\beta$-ethylenically unsaturated carboxylic acid of 3-5 carbon atoms in which the carboxyl groups have been at least partially neutralized with sodium or potassium cations. Other suitable crystallization promotors include materials derived from (a) polyethylene terephthalate and/or polybutylene terephthalate oligomer and (b) sodium and/or potassium ion sources capable of reacting with the carboxyl groups on the oligomer(s) of (a). Further, it is preferred that the crystallization promoter be present in an amount sufficient to provide $\Delta H_H/\Delta H_c$ ratio to the composition of less than 0.25. It has been found that the $\Delta H_H/\Delta H_c$ ratio is a convenient method of measuring the degree of crystallization. Procedures for measuring this ratio and further details concerning the crystallization promoter are described, for example, in U.K. Pat. Nos. 2,015,013 and 2,015,014.

The reinforcing and filling material can be glass, graphite or aramid fibers, glass beads, aluminum silicate, asbestos, mica, calcium carbonate and the like, and combinations of such materials. Glass fibers are preferred. The compositions of the present invention can contain up to 80% by weight of reinforcing or filling material, preferably 0-50%, and most preferably 0-45%. Compositions containing polyoxyalkylene oxide "soft segments" and ethylene/butyl acrylate/glycidyl methacrylate elastomeric toughener and 2-8% glass fibers have shown surprisingly good Gardner impact and are especially preferred for certain end uses. Other compositions containing 25-45% glass fibers have shown remarkable good over-all balance of properties and are especially preferred for certain end uses.

The compositions of the present invention can be prepared by blending the various ingredients together by any convenient means to obtain an intimate blend in which the ethylene copolymer toughener is dispersed throughout the polyester resin matrix as separate particles, such that the ethylene copolymer particles have a number average particle size of less than 3 microns. Temperature and pressure conditions are not critical. Mixing equipment and shear conditions can vary widely, however, high shear equipment and conditions are preferred to insure number average particle size of the ethylene copolymer toughener will be as small as possible, and in any event, below 3 microns.

Particle size is measured by preparing slices 200 nanometers thick of sample composition by microtoming molded test bars in the center of the bar, perpendicular to the long axis of the bar using a Sorvall MT-2B ultra-microtome, Christensen cryogenic cell, diamond knife, operating at $-90°$ C., using ethanol as a knife lubricant. After cutting, the slices were floated on water, picked up on 200 mesh copper grids, an photographed without staining with a Zeiss EM10A TEM operating at 80 KV. The 70 mm camera was loaded with Eastman fine grain release positive film type 5302. Using standard darkroom procedures, $8'' \times 10''$ photographs were produced using a Durst enlarger at a magnification of 4.3×, giving a net magnification of 11,800×.

The photographs were analyzed with a "Quantimet" 900 image analyzer (Cambridge Instruments, Inc.). Particle differentiation was accomplished by means of an automatic detection level cut-off modified by editing with a light pen. Tiny particles of matrix resin (dark) inside of toughener particles (light) were ignored. The light pen was used to separate particles that touched and were not separated in the automatic "detect" mode. Enough photographs were analyzed in each area to count at least 750 particles greater than 0.04 micrometers. Particles less than 0.04 micrometers wide were ignored as photometric noise. Width and length were measured by 8 ferets and distributed into 48 logrithmically distributed bins from 0.04 to 40.0 micrometers. The measured length and width are of two-dimensional images and have not been stereologically corrected to estimate the true maximum and minimum diameters of the three-dimensional particles. Number average and standard deviation for each distribution was calculated by standard procedures.

Accordingly, the compositions of the present invention consist essentially of:

A. 60-97 weight % based on the total of components A and B of a polyester matrix resin having an inherent viscosity of at least 0.3, and B. 3-40 weight % based on the total of components A and B of an ethylene copolymer of the formula E/X/Y where E is the radical formed from ethylene and comprises 40-90 weight % of the ethylene copolymer, X is the radical formed from

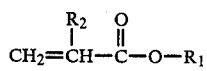

where $R_1$ is alkyl of 2-8 carbon atoms, and $R_2$ is H, $CH_3$ or $C_2H_5$, and X comprises 10-40 weight percent of the ethylene copolymer, and Y is selected from the group consisting of glycidyl methacrylate and glycidyl acrylate, and Y comprises 0.5-20 weight percent of the ethylene copolymer, said composition optionally also containing C. 0–15 parts by weight of a plasticizer per hundred parts of the matrix resin A, D. 0–15 parts by weight of a polyalkylene oxide soft segment incorporated into the matrix resin polymer chain per hundred parts of the matrix resin A, E. 0–16 parts by weight of a crystallization promoter per hundred parts of the matrix resin A, and F. 0–80 weight percent based on the total of components A, B and F of at least one material selected from the group consisting of reinforcing and filling materials.

In the following Examples, there are shown specific embodiments of the present invention demonstrating the extraordinary low temperature toughness of the compositions of the present invention, even as compared to a composition containing an ethylene/methylacrylate/glycidyl methacrylate toughener. All parts and percentages are by weight, and all temperatures are in degrees Celsius unless otherwise specified. Measurements not originally in SI units have been so converted and rounded where appropriate.

EXAMPLE 1

A polymer containing normal butyl acrylate, ethylene and glycidyl methyl acrylate was produced by a free-radical polymerization carried out at a reactor temperature of 190° C. and 190 MPa (27,000 psi). Monomer addition was adjusted to give a polymer containing approximately 6% of glycidyl methacrylate (GMA), 31% of n-butyl acrylate (BA) and 63% of ethylene. A blend was prepared from 20.4% of this polymer (E/31-/BA/6GMA-20 melt index) with 79.6% PET of 0.6 inherent viscosity (1) by dry blending these ingredients together by tumbling in a polyethylene bag, (2) melt blending in a 28 mm Werner and Pfleiderer extruder which had two sets of kneading blocks and reverse bushings. The hopper was blanketed with nitrogen and the vacuum port on the extruder was maintained at 27.5 inches vacuum. Extruder barrel temperatures were set at 270° C. except for the first zone which was set at 240° C. Extruder RPM was 200. Feed was ~19 lbs/hr. Melt temperature was approximately 305° C. The melt exiting the extruder was quenched in water and then cut. The cut strands were dried overnight at 110° C. and then molded into ½"×5"×⅛" thick test bars in a 6 oz. injection molding machine with the following conditions: barrel temperatures=285° C.; cycle=30 second injection forward time, 20 seconds additional mold close, and 3 seconds mold open; melt=305° C.; mold cavity=50° C. The bars were then annealed at 150° C. overnight in order to come to a constant level of crystallinity. The notched Izod according to ASTM D-256-56 was 20.1 ft-lbs/in at 23° C., as compared with 0.5–0.6 ft-lbs/in for a control without any ethylene copolymer toughener. 61.4% of this blend was dry blended with 30% of a commercial glass, 3.8% of a sodium neutralized ethylene methacrylic acid copolymer, 0.6% of a condensation product of epichlorohydrin and bisphenol A, 3.9% dibenzoate of neopentyl glycol and 0.3% of a hindered phenolic antioxidant. This was melt blended in a 2-inch single screw extruder with a barrel temperature of approximately 270° C. This was then molded in a 6 oz. injection molding machine at similar conditions to above except the cycle was 20, 20, 3; and the mold cavity temperature was ~110° C. A control containing all ingredients above was also evaluated. The notched Izod was 3.63 ft-lbs/in as compared with 2.10 ft-lbs/in for the control.

EXAMPLES 2–17

In the following Examples, 18% of each was the ethylene copolymer toughener described in Example 1, 81.5% was polyethylene terephthalate of an inherent viscosity of approximately 0.6, or polybutylene terephthalate of an inherent viscosity of approximately 0.8–0.9, and 0.5% was "Irganox" 1010 a hindered phenolic antioxidant. These ingredients were dry blended together by tumbling in a polyethylene bag. The mixture was then blended in a 28 mm Werner and Pfleiderer extruder which had two sets of kneading blocks and reverse sections in which the hopper is blanketed with nitrogen and the vacuum port maintained at about 28 inches vacuum. Extruder barrel temperatures were set at 270° C. except for the first zone which was set at 200° C. Melt temperatures were approximately 290°–300° C. The melt exiting the extruder was quenched in water and then cut. The cut strands were dried overnight at 110° C. and then molded into ½"×5"×⅛" thick test bars in a 6 oz. injection molding machine. With PET, barrel temperatures were approximately 285° C., melt was 295° C. With PBT, the barrel temperatures were 240° C. and melt was ~240° C. Mold temperatures were 50° C. The cycle was 20 seconds injection forward, 20 seconds additional mold close and 2 seconds mold open. The bars were then annealed at 150° C. overnight in order to come to a constant level of crystallinity. The notched Izod was evaluated in approximate accord to ASTM D-256-56. The reported values represent the average of tests on 6 samples—3 from near the gate end of the bar and 3 from near the other end.

In Table I below, the column labeled "polyester" designates the type of polyester matrix resin: PET is polyethylene terephthalate i.v. 0.6, PBT is polybutylene terephthalate i.v. 0.8–0.9. The column labeled "X" designates the weight percent and type of monomer X in the ethylene copolymer toughener as defined above, BA is butyl acrylate; MA is methyl acrylate; VA is vinyl acetate; CO is carbon monoxide. The column labeled "% GMA" is the weight percent of glycidyl methacrylate monomer in the ethylene copolymer toughener. The column labeled "M.I." is the approximate melt index (measured according to ASTM-D-1238 Condition E) of the ethylene copolymer toughener; Example 3 used a 50/50 blend of the ethylene copolymers from Examples 2 and 4; Example 5 used a 50/50 blend of the ethylene copolymers from Examples 2 and 7; Example 8 used a 50/50 blend of an E/19 MA/4.4 GMA (melt index=29) copolymer and an E/22 MA/12.7 GMA (melt index=68) copolymer. The last three columns report average notched Izod values for tests run at 23° C., 0° C. and −20° C., respectively.

It can be seen from the data in Table I that as temperature decreases the E/BA/GMA tougheners are clearly superior to the E/MA/GMA and E/VA/CO/GMA copolymers, especially at −20° C., all other parameters being equal.

TABLE I

| EXAMPLE | POLYESTER | X | % GMA | M.I. | Izod 23° C. (J/m) | Izod 0° C. (J/m) | Izod −20° C. (J/m) |
|---|---|---|---|---|---|---|---|
| 2 | PET | 35BA | 0.00 | 34.0 | 35.2 | 31.8 | 21.9 |
| 3 | PET | 33BA | 2.25 |  | 81.7 | 71.8 | 52.3 |
| 4 | PET | 31BA | 4.50 | 9.1 | 472.1 | 97.2 | 66.2 |
| 5 | PET | 31BA | 4.50 |  | 435.2 | 91.8 | 56.1 |
| 6 | PET | 24BA | 4.50 | 8.0 | 351.4 | 92.6 | 59.0 |
| 7 | PET | 28BA | 8.40 | 11.0 | 1105.4 | 699.5 | 98.3 |
| 8 | PET | 18.6MA | 4.40 | 12.0 | 351.4 | 86.2 | 46.5 |
| 9 | PET | 20MA | 8.60 |  | 844.8 | 103.3 | 45.9 |
| 10 | PET | 27VA/4.3CO | 4.10 | 12.0 | 179.4 | 86.8 | 45.1 |
| 11 | PET | 71VA | 4.60 | 40.0 | 157.0 | 74.2 | 50.5 |
| 12 | PBT | 35BA | 0.00 | 34.0 | 49.1 | 38.7 | 29.6 |
| 13 | PBT | 31BA | 4.50 | 9.1 | 192.8 | 94.8 | 58.2 |
| 14 | PBT | 28BA | 8.40 | 11.0 | 453.9 | 101.5 | 65.1 |
| 15 | PBT | 19MA | 4.40 | 29.0 | 100.4 | 53.4 | 40.6 |
| 16 | PBT | 27VA/4.3CO | 4.10 | 12.0 | 136.7 | 83.3 | 46.7 |
| 17 | PBT | 21VA | 4.60 | 40.0 | 120.7 | 61.9 | 39.5 |

Examples 18-43

In the following Examples, various quantities of ethylene copolymer toughener (as indicated in Table II) were blended with polyethylene terephthalate of an inherent viscosity of approximately 0.6 substantially as described for Examples 2-17 above. Test bars were prepared and tested, also as described for Examples 2-7, above, and the results are reported in Table II, below, where the column headings are the same as for Table I, except the weight % of the ethylene copolymer toughener (E/X/GMA) is also indicated.

It can be seen from the data in Table II that, especially at low temperatures, the compositions containing E/BA/GMA and E/EA/GMA (EA is ethyl acrylate) generally have superior toughness, even as compared with the adjacent homolog E/MA/GMA toughener.

TABLE II

| EXAMPLE | WT. % E/X/GMA | X | % GMA | Izod 23° C. (J/m) | Izod 0° C. (J/m) | Izod 20° C. (J/m) |
|---|---|---|---|---|---|---|
| 18 | 3 | 28BA | 8.4 | 33.6 | 31.2 | 27.3 |
| 19 | 3 | 31BA | 4.5 | 53.4 | 88.6 | 21.1 |
| 20 | 3 | 31BA | 4.5 | 35.2 | 34.7 | 20.8 |
| 21 | 3 | 28BA | 4.5 | 32.0 | 23.0 | 48.1 |
| 22 | 3 | 21MA | 4.4 | 37.4 | 22.2 | 30.2 |
| 23 | 10 | 28BA | 8.4 | 104.1 | 61.1 | 42.2 |
| 24 | 10 | 31BA | 4.5 | 113.7 | 103.9 | 45.9 |
| 25 | 10 | 28EA | 4.5 | 105.2 | 77.7 | 15.2 |
| 26 | 10 | 21MA | 4.4 | 105.2 | 43.0 | 40.9 |
| 27 | 12 | 31BA | 4.5 | 139.9 | 86.5 | 56.1 |
| 28 | 12 | 31BA | 4.5 | 130.8 | 143.6 | 61.4 |
| 29 | 18 | 28BA | 8.4 | — | 180.2 | 145.5 |
| 30 | 18 | 28BA | 8.4 | 738.5 | 186.9 | 99.3 |
| 31 | 18 | 31BA | 4.5 | 767.9 | 512.9 | 126.0 |
| 32 | 25 | 31BA | 4.5 | 891.8 | 512.6 | 176.8 |
| 33 | 25 | 28EA | 3.0 | 891.8 | 376.7 | 143.1 |
| 34 | 25 | 28EA | 4.5 | 955.9 | 852.5 | 134.6 |
| 35 | 25 | 28EA | 4.5 | — | 503.8 | 105.2 |
| 36 | 25 | 28EA | 6.0 | 1003.4 | 911.0 | 145.5 |
| 37 | 25 | 31EA | 4.5 | — | 612.2 | 111.3 |
| 38 | 25 | 21MA | 4.4 | 791.4 | 199.4 | 108.1 |
| 39 | 40 | 31BA | 4.5 | 887.0 | 919.0 | 937.7 |
| 40 | 40 | 31BA | 4.5 | 828.8 | 820.8 | 909.1 |
| 41 | 40 | 28EA | 4.5 | 692.6 | 932.4 | 1025.3 |
| 42 | 40 | 21MA | 4.4 | 834.6 | 214.4 | 117.5 |
| 43 | 40 | 21MA | 4.4 | 720.9 | 672.3 | 86.5 |

I claim:

1. A polyester molding composition comprising
 (A) 60-97 weight % based on the total of components A and B of a polyester matrix resin having an inherent viscosity of at least 0.3, wherein the polyester consists essentially of a linear saturated condensation product of at least one glycol selected from the group consisting of neopentyl glycol, cyclohexane dimethanol and aliphatic glycols of the formula HO(CH$_2$)$_n$OH where n is an integer of 2 to 10 and at least one aromatic dicarboxylic acid having 8 to 14 carbon atoms, or reactive derivatives thereof, and
 (B) 3-40 weight % based on the total of components A and B of an ethylene copolymer of the formula

E/X/Y where
  E is the radical formed from ethylene and comprises 40-90 weight percent of the ethylene copolymer,
  X is the radical formed from

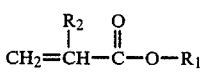

where R$_1$ is alkyl of 2-8 carbon atoms and R$_2$ is H, CH$_3$ or C$_2$H$_5$, and X comprises 10-40 weight percent of the ethylene copolymer, and
  Y is selected from the group consisting of glycidyl methacrylate and glycidyl acrylate, and Y comprises 0.5-20 weight percent of the ethylene copolymer.

2. The compositions of claim 1 wherein the ethylene copolymer is dispersed throughout the polyester matrix resin as separate particles having a number average particle size of less than 3 micrometers.

3. The compositions of claim 1 where the polyester also contains >0-20 mole % of units derived from aliphatic dicarboxylic acids having 2 to 12 carbon atoms.

4. The compositions of claim 1 where the polyester is selected from the group consisting of polyethylene terephthalate homopolymer, polybutylene terephthalate homopolymer, polyethylene terephthalate/polybutylene terephthalate copolymers, polyethylene terephthalate/polybutylene terephthalate mixtures and mixtures thereof.

5. The compositions of claim 1 where the polyester matrix resin comprises 65-95% by weight of the composition, based on the total of components A and B.

6. The compositions of claim 1 where the polyester matrix resin comprises 70–85% by weight of the composition, based on the total of components A and B.

7. The compositions of claim 1 where $R_1$ is alkyl of 4–6 carbon atoms.

8. The compositions of claim 1 where $R_1$ is alkyl of 4 carbon atoms.

9. The compositions of claim 1 where $R_2$ is H or $CH_3$.

10. The compositions of claim 1 where $R_2$ is H.

11. The compositions of claim 1 where X comprises 15–35 weight % of the ethylene copolymer.

12. The compositions of claim 1 where X comprises 20–35 weight % of the ethylene copolymer.

13. The compositions of claim 1 where X is butyl acrylate.

14. The compositions of claim 1 where Y is glycidyl methacrylate.

15. The compositions of claim 1 which also contain 0–15 parts by weight of plasticizer per hundred parts of the matrix resin.

16. The compositions of claim 15 where the plasticizer is a compound of the formula

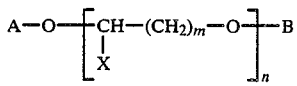

where
m is an integer from 1 to 3, inclusive,
n is an integer from 4 to 25, inclusive,
X is $CH_3$, $C_2H_5$ or H,
A is alkyl, acyl or aroyl of 1–10 carbon atoms, and B is alkyl, acyl or aroyl of 1–10 carbon atoms.

17. The compositions of claim 15 where the plasticizer is polyethylene glycol 400 bis(2-ethylhexanoate).

18. The compositions of claim 1 where the polyester also contains >0–15 parts by weight of polyalkylene oxide soft segments incorporated into the backbone of the polyester per hundred parts of the polyester.

19. The compositions of claim 18 where the polyalkylene oxide is polyethylene oxide, optionally containing a minor proportion of alkylene oxide units other than ethylene oxide units.

20. The compositions of claim 18 which also contains 0–15 parts by weight of plasticizer per hundred parts of the matrix resin.

21. The compositions of claim 20 where the total weight proportion of the plasticizer and the soft segment is 9–20 parts by weight per hundred parts of the matrix resin.

22. The compositions of claim 21 where the relative quantity of soft segment and plasticizer is from 85:15 to 15:85.

23. The compositions of claim 1 which also contains 0–16 parts by weight of a crystallization promoter per hundred parts of the matrix resin.

24. The compositions of claim 23 where the crystallization promoter is derived from
(a) hydrocarbon acids containing 7–54 carbon atoms or organic polymers having at least one carboxyl group attached thereto, and
(b) sodium and/or potassium ion sources capable of reacting with the carboxyl groups of the acids or polymers of (a), where the concentration of said sodium and/or potassium in said polyester matrix resin (A) is at least 0.01 weight percent.

25. The compositions of claim 1 which also contains 0–80% by weight of a material selected from the group consisting of reinforcing and filling materials.

26. The compositions of claim 25 where the reinforcing and filling materials are selected from the group consisting of glass fibers, graphite fibers, aramid fibers, glass beads, aluminum silicate, asbestos, mica and calcium carbonate.

27. Molded articles made from the composition of claim 1.

28. Molded articles comprising
(A) 60–97 weight % based on the total of components A and B of a polyester matrix resin having an inherent viscosity of at least 0.3, and
(B) 3–40 weight % based on the total of components A and B of an ethylene copolymer of the formula

E/X/Y where
E is the radical formed from ethylene and comprises 40–90 weight percent of the ethylene copolymer,
X is the radical formed from

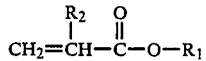

where $R_1$ is alkyl of 2–8 carbon atoms and $R_2$ is H, $CH_3$ or $C_2H_5$, and X comprises 10–40 weight percent of the ethylene copolymer, and
Y is selected from the group consisting of glycidyl methacrylate and glycidyl acrylate, and Y comprises 0.5–20 weight percent of the ethylene copolymer.

* * * * *